Figure 1:
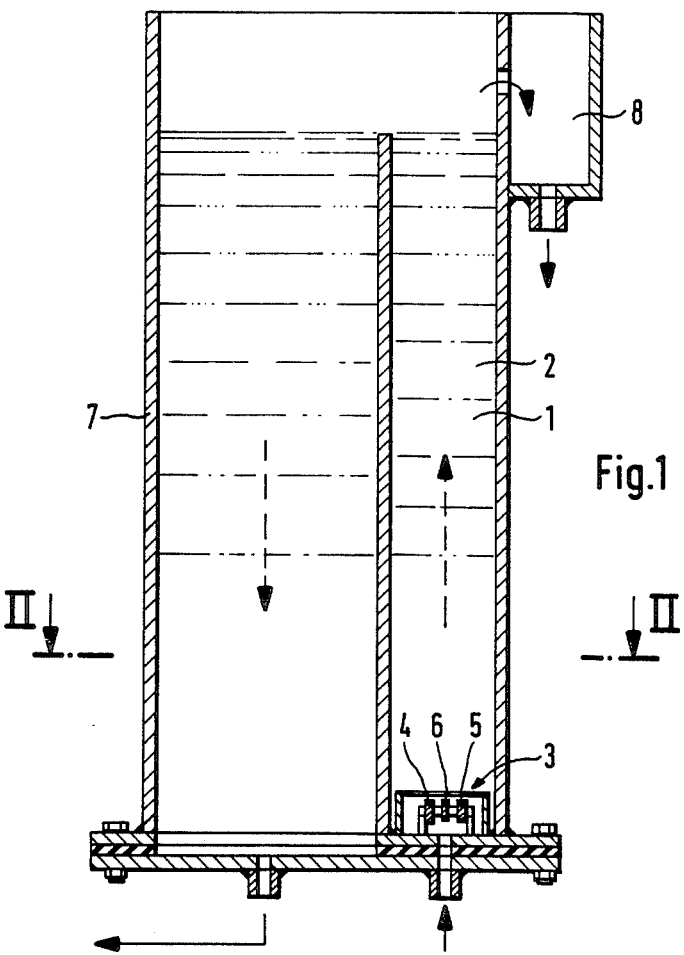

United States Patent [19]

Renzler

[11] Patent Number: 4,728,403

[45] Date of Patent: Mar. 1, 1988

[54] PROCESS FOR THE REGENERATION OF CLEANING AND DEGREASING BATHS AND DEVICE FOR APPLICATION OF THE PROCESS

[76] Inventor: Edgar Renzler, Siegstrasse 2, Köln 40, 5000, Fed. Rep. of Germany

[21] Appl. No.: 865,734

[22] PCT Filed: Aug. 6, 1985

[86] PCT No.: PCT/DE85/00264

§ 371 Date: Jun. 11, 1986

§ 102(e) Date: Jun. 11, 1986

[87] PCT Pub. No.: WO86/01233

PCT Pub. Date: Feb. 27, 1986

[30] Foreign Application Priority Data

| Aug. 11, 1984 | [DE] | Fed. Rep. of Germany | 3429612 |
| Oct. 9, 1984 | [DE] | Fed. Rep. of Germany | 3437055 |
| Nov. 12, 1984 | [DE] | Fed. Rep. of Germany | 3444074 |
| Apr. 26, 1985 | [DE] | Fed. Rep. of Germany | 3515095 |
| Jul. 20, 1985 | [DE] | Fed. Rep. of Germany | 3525963 |

[51] Int. Cl.⁴ .............................................. C02F 1/46
[52] U.S. Cl. .................................................. 204/149
[58] Field of Search ........................ 204/149, 152

[56] References Cited

U.S. PATENT DOCUMENTS 4,439,290 3/1984 Marfurt ............................ 204/149

FOREIGN PATENT DOCUMENTS

| 2627964 | 1/1978 | Fed. Rep. of Germany | 204/149 |
| 3031773 | 2/1982 | Fed. Rep. of Germany | 204/149 |
| 2243025 | 4/1975 | France | 204/149 |
| 1437274 | 5/1976 | United Kingdom | 204/149 |

Primary Examiner—T. M. Tufariello
Attorney, Agent, or Firm—Eric P. Schellin

[57] ABSTRACT

The invention is relative to a method for the regeneration of neutral to alkaline cleaning and degreasing baths in an electrolysis cell powered by direct current. This method consists essentially in that soaps and emulsified constituents of the baths coagulate and float in a cell with at least one bundle of stable and/or soluble electrodes, whereby the bundle or bundles of stable electrodes comprise(s), if necessary, one or more interposed soluble metal inlays, in a neutral to alkaline range with a current consumption of 0.1 to 4 Ah/dm³ and a correspondingly predetermined residence time, and solids which are formed are filtered off as necessary. An ultrafiltration or fine filtration of the frothy stage drawn off is connected in afterwards for reclaiming tensides. A device for carrying out this method is also described.

6 Claims, 6 Drawing Figures

PROCESS FOR THE REGENERATION OF CLEANING AND DEGREASING BATHS AND DEVICE FOR APPLICATION OF THE PROCESS

The invention relates to a process for the regeneration of used cleaning and degreasing baths in an electrolysis cell powered by direct current and the apparatus for carrying out the method.

With the cleaning and simultaneous degreasing of metallic materials or plastic materials, which are subsequently coated, galvanized or coated by galvanic or an electro-immersion process, after a certain period of time used baths arise which contain in addition to portions of the components for cleaning and degreasing, emulsified oils and fats and dispersed soiled materials which have to be worked up for the following reasons.

Cleaning and degreasing baths are, as is known, watery fluids containing mainly sodium hydroxide, potassium hydroxide, carbonates, phosphates, silicates, wetting agents, emulsifiers and dispersants. Besides these, as far as is required by the processes which follow the cleaning and degreasing of the surfaces, there may also be nitrides, fluorides and complex salts present in the baths.

The action of the cleaning fluids is based, above all, on peptizing and dispersing the impurities present on the surfaces of the work pieces or parts being treated, particularly the adherent oils and fats, and subsequent stabilization of the emulsion as well as the saponification of the saponifiable fats.

With the typical emulsifiers that are present in the fluids, the hydrophyle-lipophyle equilibrium is decisive, depending on the composition of the fats and oils that are to be dissolved by these processes.

Since mainly poorly biologically degradable sulphonates, wetting agents and tensides are also added to the described cleaning and degreasing fluids, they are always with environmentally hostile fluids whose removal, after their cleaning power has been exhausted, is possible only after the addition of special agents and the associated high expenses. Used cleaning and degreasing baths are emulsions, i.e. dispersed systems of two immiscible or partially miscible fluids and phases, the one phase of which is finely divided in the other phase. Typical examples of these are the water/oil and oil/water emulsions i.e. water-oil systems where the water as well as the oil can form the inner phase.

As a result of the customary replenishment of the cleaning baths, i.e. the continuous addition of fresh salts to the cleaning baths in use, further wetting agents, tensides and emulsifiers are added to the solution, so that the critical colloidal salt concentration is partially largely exceeded and thereby forms extremely stable aggregates whose decomposition thereafter is extremely difficult.

Since however, as is known, only small emounts of free, dissolved or emulsified oils can be passed to the sewers, it is necessary to work up the used cleaning and degreasing baths at a pH of about 4.5 to decompose the emulsions. With this measure, however, all functional components of the baths are destroyed simultaneously. Hence, it is necessary when working up the baths in this way, for the treatment of the used fluids to close down the whole cleaning and degreasing plant, so that a continuous operation of the cleaning and degreasing plant is not possible. Regeneration of the used cleaning and degreasing baths is therefore of special significance for numerous reasons.

The processes known up to now for working up used cleaning and degreasing baths, are, it is true, suitable to a greater or lesser extent for separating the emulsified oils and fats from these baths, but up to now they have not succeeded in removing the environmentally harmful bath additivies entirely from the baths nor do they recover the useful constituents of the baths which are removed together with the oils and greases. Moreover, it is necessary to mention, as an additional disadvantage of the known processes, the fact that the plant used for cleaning and degreasing of components has to be closed down when working up the baths.

The invention has set out to eliminate the described difficulties and to provide a continuous as possible process for cleaning and degreasing of work pieces and parts of metal, plastics or the like, whereby it will mean an extremely important advance in the field of used cleaning and degreasing baths, if, by means of electrocoagulation and electroflotation, the removal of the used fluids is thereby rendered superfluous so that they could be recovered in a progressive manover with justification of the energy involved.

It is an object of the invention to solve the problem of providing a process for regenerating used baths for cleaning and degreasing, with which one can succeed in recovering the fluids of the kind described above without the known difficulties and also achieve that the valuable constituents of the emulsions are not carried away with the water or the oils and fats without the possibility of recovering them, since they, although useful for further use, constitute a real environmental problem.

This invention provides a process for the regeneration of neutral to alkaline cleaning and degreasing baths in an electrolysis cell powered by direct current that is characterized in that soaps and emulsified constituents of the baths coagulate and float in a cell with at least one bundle of stable and/or soluble electrodes, whereby the bundle or bundles of electrodes comprise, if necessary, one or more interposed soluble metal inlays, in a neutral to alkaline range with a current consumption of 0.1 to 4 $Ah/dm^3$ and a correspondingly predetermined residence time, and solids which are formed are filtered off as necessary.

This process according to the invention is not comparable to the process described in DE OS No. 22 12 959 and relative to a process for the separation of water in soluble materials, particularly oils and water, since the known process is concerned with a flocculation action with pH values between 6.5 and 9.5 where the hydroxides which adsorb non-watersoluble matter on their surfaces are formed on the anode of the device.

This known process is not suitable for reclaiming the alkaline solutions, since the invention's essential characteristic of flotation can not be performed in this arrangement. For the process according to the invention, a sufficiently high electrical field is likewise of importance, a sufficiently high electrical field is likewise of importance, since by stripping off the diffuse double layer of emulsified particles, the initial coagulation is facilitated and also the gas bubbles that form can adsorb and carry away coagulated oils and grease on their surfaces. The surface-active agents which are already in the cleaning fluids support this microflotation and the solid particles which are destabilized thereby are carried away by means of froth flotation or filtered away later at dense solid contents.

The process according to the invention can be carried out continuously as well as intermittently, whereby the continuous operation has special significance since the process of cleaning and degreasing of the work pieces or parts in a plant designed for washing and degreasing is not interrupted.

The used fluids that are removed from the cleaning and degreasing plant are advantageously subjected to a pre-filtration before they are fed to the electrolysis cell. Here, the coagulation can be performed first or the flotation can be done in a following cell, or coagulation and flotation are performed directly in the same cell, where a settling and sedimentation chamber should follow.

According to the invention, all permanent electrodes, such as platinum, titanium, platinum covered titanium or refined steel electrodes can be used for the stable electrodes, while at least one metal soluble by induction is used as an inlay, particularly an iron or aluminium plate, to form a hydroxide. If soluble electrode parts are used, then metals that form hydroxides can be used.

To support the coagulation, it is advisable to increase the quantity of the coagulation medium given off by providing at least one interconnected soluble metal inlay in the bundles of soluble electrodes.

In the process according to the invention it is advantageous to regenerate the baths at pH-values in the range of 6.5 to 12.6, a current consumption of 0.1 to 4 Ah/dm$^3$ and a residence time of 2 to 500 min. and to coagulate and flotate the oils, greases and pollutants. It is advantageous to work with a residence time of 5 to 40 min. The regeneration can be performed with pH-values in the range of 8.5 to 10 and a residence time of 5 to 120 min. at a current consumption of 0.1 to 2 Ah/dm$^3$.

Appropriately, care should be taken with the process according to the invention that the surface relationship of the stable and soluble electrodes to the soluble metal inlay is on the order of 1:0.5 to 1:100, preferably 1:1 to 1:20 and the ratio of the fluid content of the electrolytes cell to that of the cleaning and degreasing device are 1:0.5 to 1:100, preferably 1:5 to 1:60, particularly 1:20. In each case, it is of advantage to work with a periodic change in the direction of the direct current every 5 to 3600 sec.

Within the framework of the invention and without a fundamental change of the inventive thought, it is possible for the electrode bundle with the metal inlay to be installed directly in a cleaning and degreasing plant. In this case, the ratio of the surfaces of the electrodes which face one another to the upper surface of the fluid of this plant should be on the order of 1:0.5 to 1:100, preferably 1:2 to 1:20, particularly preferable 1:10 to 1:15.

The process according to the invention has the great advantage that the coagulant as well as the gases are removed from the emulsions in such quantities that the coagulated grease and oil particles as well as the dirt particles froth up on to the upper surfaces of the cell, while the valuable constituents of the emulsions hardly froth up and therefore are not taken out of the cell. Altogether, the process according to the invention brings considerable technical advances, particularly in the preparation of used cleaning and degreasing baths from the professional and industrial cleaning of metal and plastic parts; since, firstly, the same cleaning and degreasing fluid can be used many times and at the same time the usual environmental pollution is avoided or reduced to a minimum.

Coagulation and flotation can be performed according to the invention in such a manner that in the cell either coagulation only is done at first, and then flotation is done in a subsequent cell, or the coagulation and flotation can also be done directly in the same cell, whereby a settling and sedimentation chamber and a filter for reclaiming the tensides should be connected in afterwards.

Apparatuses for operating the process according to the invention are described in the drawings and the invention will be further described with reference to them.

Figure 2:
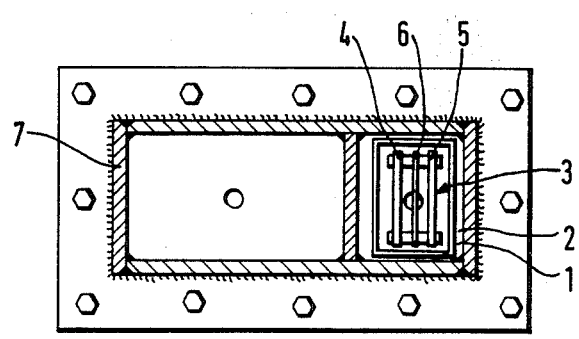

An apparatus for operating the process according to the invention is shown in section in FIG. 1. This apparatus comprises mainly one electrocoagulator 2 with bundle 3 of stable electrodes 4 and 5, arranged inside of it and with an intermediate metal inlay 6. Electrocoagulator 2 is situated in reactor 7 with overflow system 8. The electrocoagulator 2 included with the reactor 7 is shown in section in FIG. 2 along line II—II. Electroflotator 1 of FIG. 1 is found in a similarly constructed, subsequent device which is, however, not shown in this connection.

Figure 3:
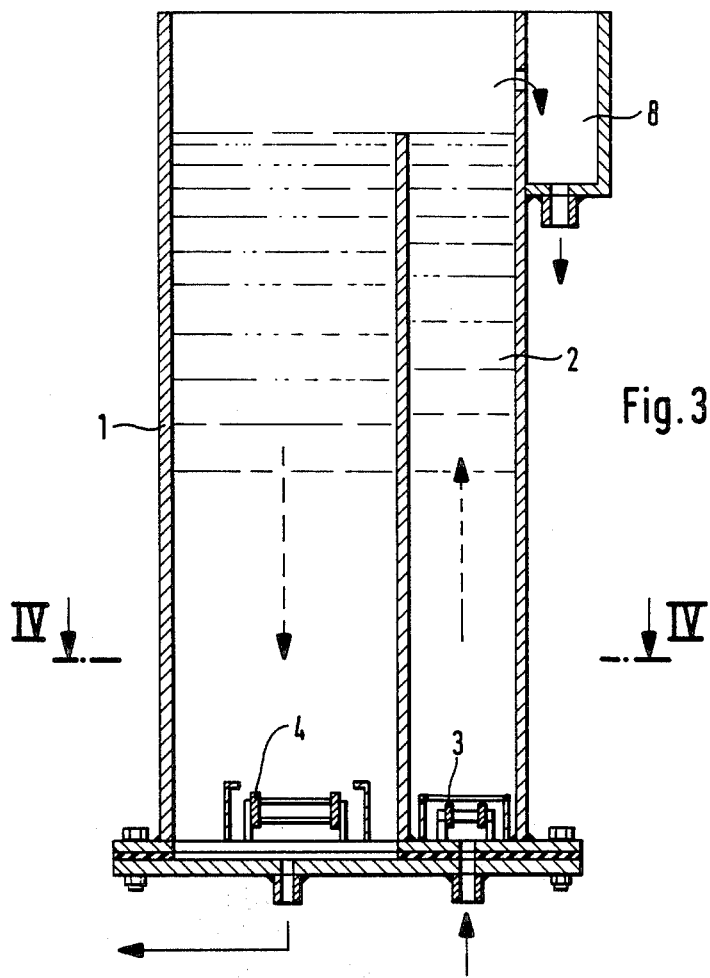
Figure 4:
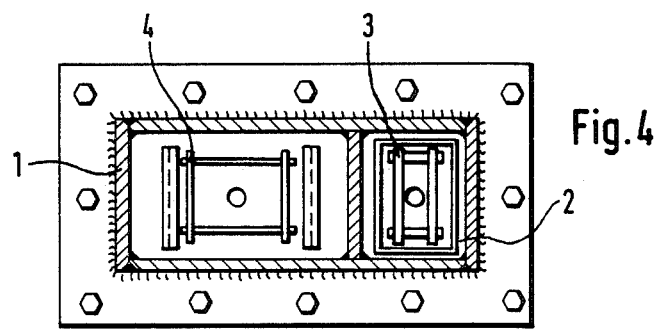

An additional device for operating the process according to the invention is shown in section in FIG. 3. This variant comprises mainly an electrocoagulator 2 with directly connected electroflotator 1, the two being included in one reactor with an overflow system. An electrode bundle 3 of a hydroxide-forming metal is integrated in the electrocoagulator 2. In the electroflotator 1, there is an electrode 4 of stable electrodes. The section of this device is shown in FIG. 4 along line IV—IV.

Figure 5:
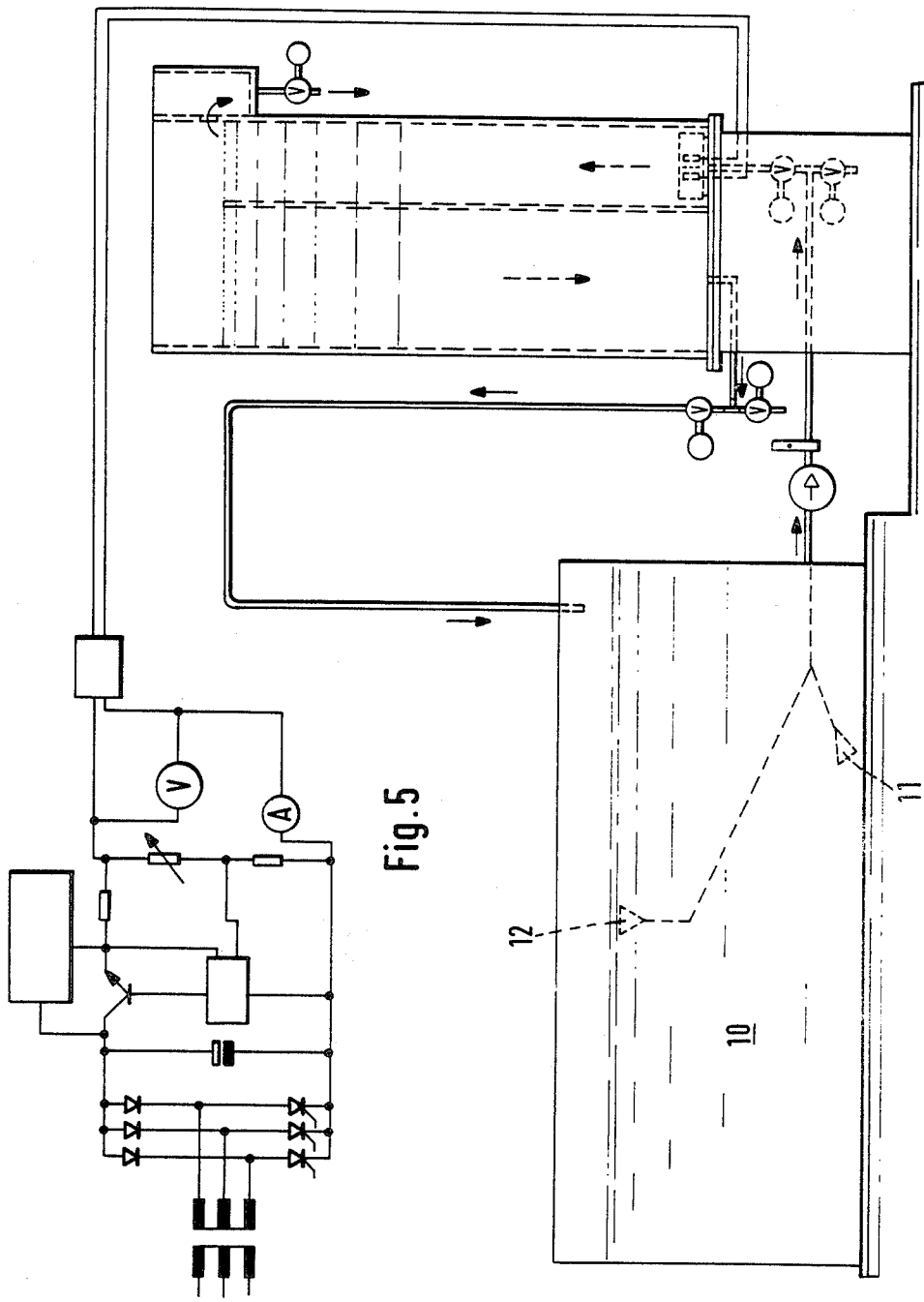

FIG. 5 represents a combined view of the apparatus for operating the process according to the invention, where for the purpose of clarity the electroflotator and coagulator including the overflow system integrated into the reactor are no shown in detail. The cleaning and degreasing device 10 with basal outlet 11 and surface outlet 12 are depicted in more detail. From the complete representation of the apparatus, the parts which are not described more fully, such as rectifiers with governors and pulsation device, ammeters, voltmeters, pumps, flow meters and inlet and outlet conduits as well as valves necessary for the operation of the process according to the invention are comprehensible and workable to a person skilled in the art without further clarification.

Figure 6:
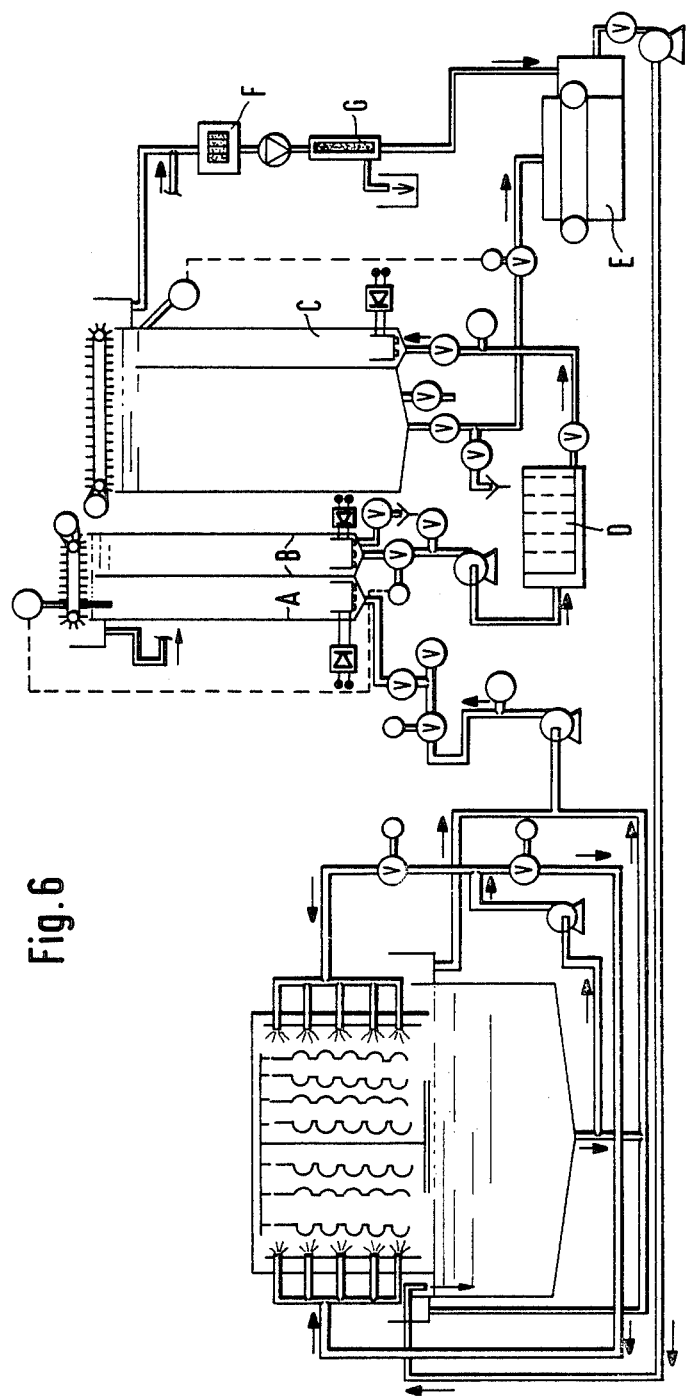

FIG. 6 shows a simplified, not detailed, example of a flow diagram of the process according to the invention relating to a cleaning and degreasing device connected to a two-stage regenerator of the cleaning and degreasing bath. Here, in the first stage of the regenerator pre-coagulation is performed with hydroxide-forming electrode materials in coagulation chamber 5 and the flotation of the oil, greases and pollutants is performed in flotation chamber A. Then, after filtration of the fluids in the second regenerational stage, a combined main coagulation and flotation is carried out in cell C. The following filtration units are designated by D and E, a froth breaker for the reclaiming of tensides is indicated by F and an ultra-filtration or fine filtration by G.

I claim:

1. A process for the regeneration of an aqueous neutral or alkaline cleaning and degreasing emulsion containing soap or detergent emulsified constituents as an impurity comprising charging said emulsions into an electrolytic cell, said cell having at least one pair of inert electrodes, said inert electrodes having at least one non-electric touching decomposable hydroxyl producing metal structure between said electrodes, said metal being decomposable under neutral to alkaline conditions of between a pH of 7 to a pH of 12, impinging a D.C. current on said electrodes of 0.1 to 4 $Ah/dm^3$ whereby said metal structure is decomposed as a metal hydroxyl complex and wherein said thus produced metal hydroxyl complex combines with said emulsified constituents and float upwardly, thereafter separating said emulsified constituents from said emulsion thereby regenerating the latter.

2. The process of claim 1 wherein the metal structure is selected from the group consisting of aluminum, and iron.

3. The process of claim 1 wherein the pH of the emulsion is at a range of between a pH of 6.5 to 12.6 and the dwell time is from 2 to 500 minutes.

4. The process of claim 2 wherein the surface relationship of an inert electrode to the metal structure is from 1:0.05 to 1:100.

5. The process of claim 3 wherein the pH of the emulsion is at a range of between a pH of 8.5 to 10 and a dwell time of 5 to 120 min. with a current consumption of 0.1 to 2 $Ah/dm^3$.

6. The process according to claims 1-4 wherein the polarity of D.C. electric current is switched every 5 to 3600 seconds.

* * * * *